Jan. 28, 1958   G. K. NEWELL ET AL   2,821,270
COMPOSITION BRAKE SHOE ASSEMBLY
Filed June 29, 1955

INVENTORS
George K. Newell
Carl D. Wright, Jr.
BY
Adelbert A. Steinmiller
ATTORNEY

United States Patent Office 2,821,270
Patented Jan. 28, 1958

2,821,270
COMPOSITION BRAKE SHOE ASSEMBLY

George K. Newell, Pitcairn, and Carl D. Wright, Jr., Pittsburgh, Pa., assignors to Westinghouse Air Brake Company, Wilmerding, Pa., a corporation of Pennsylvania Application June 29, 1955, Serial No. 518,866

4 Claims. (Cl. 188—251)

This invention relates to brake shoe assemblages and more particularly to those in which the brake shoe is made up of composition material molded onto supporting means whereby the assemblage is secured to the brake head.

In the railway brake art, brake shoes made of molded composition material have been developed which provide long brake shoe life accompanied with a minimum of wear of the railway car wheel. Brake shoes made of molded composition material have been found to be desirable on the new high-speed light-weight passenger trains, such as the Talgo type train. However, because a brake shoe of molded composition material is relatively weak against bending and shearing forces, difficulty has been encountered in supporting a brake shoe of this type in such a way that it may withstand, without damage, the forces to which it will be subjected in service.

It has heretofore been proposed to use a relatively heavy, reuseable backing plate, made of material such as cast iron or steel, to which the molded composition brake shoe block is secured by conventional methods, such as rivets or screws passing through drilled holes and then peened over, but these methods have proved unsatisfactory for commercial use because of relatively poor strength and high labor costs.

Present day foundation brake rigging construction is such as to permit brake shoes to be installed on a car truck by moving the brake head away from the wheel tread surface and then moving the brake shoe laterally into position and attaching it to the brake head with the well-known key and wedge arrangement inserted lengthwise through the brake shoe backing flange and brake head. On the modern light-weight train of the Talgo type, the foundation rigging is such that insufficient space is available for installation of the brake shoe in the usual way used on existing types of cars.

The principal object of the invention is therefore to provide a molded composition brake shoe having novel means for imparting added strength to said brake shoe and at the same time enabling the installation of the brake shoe in a simply easy manner without mechanical difficulties due to space limitations.

Another object is to provide a molded composition brake shoe which is relatively inexpensive to manufacture, install and remove.

Another object is to provide a molded composition brake shoe having novel means for facilitating installation and removal thereof to the brake rigging.

Still another object is to provide a brake shoe assembly having novel means whereby said assembly may be installed circumferentially with respect to the wheel of the vehicle with which said assembly is to be used.

Yet another object is to provide a molded composition brake shoe having novel means for imparting added strength to said brake shoe and which requires a minimum of clearance space for installation.

A further object is to provide a molded composition brake shoe assemblage which is provided with a braking and mounting plate which may be discarded when the shoe is no longer usable and which facilitates installation thereof to the brake rigging of car trucks on modern light-weight trains.

These objects and other objects and advantages will become apparent from the following more detailed description of the invention and from the accompanying drawings wherein.

Description—Figs. 1–4

Figure 1:
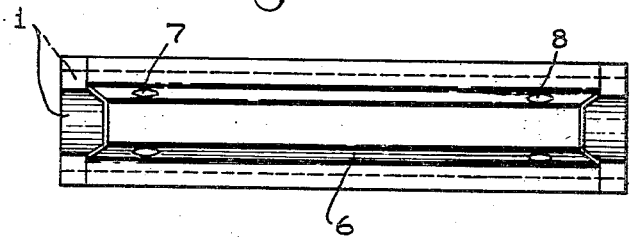
Fig. 1 is a plan view of one embodiment of an expendable brake shoe assembly including a backing channel plate adapted to facilitate installation of the shoe to the brake rigging.

Referring to Figs. 1–4 of the drawing, the brake shoe assemblage comprises a backing and mounting plate, having a backing strip 1 and a channel strip 6, constructed economically such that it may be discarded without loss when the life of the brake shoe is ended. The backing strip 1 is preferably stamped or pressed from sheet metal in such a manner that numerous holes 2 and anchor tabs 3 are formed therein as shown clearly in Fig. 4. The holes and anchor tabs are necessary to secure the backing strip 1 to the molded composition block portion 4 of the shoe, as will be explained, and also to reinforce the brake shoe assembly against shearing forces as is more fully described in the copending application, Serial No. 465,378, of George K. Newell.

Figure 3:
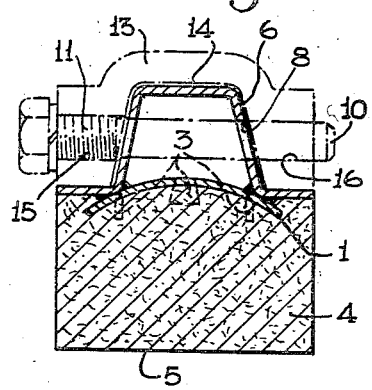
Fig. 3 is an enlarged sectional view, taken along the line 3—3 of Fig. 2.
Figure 2:
Fig. 2 is an elevational view of the embodiment shown in Fig. 1.
Figure 4:
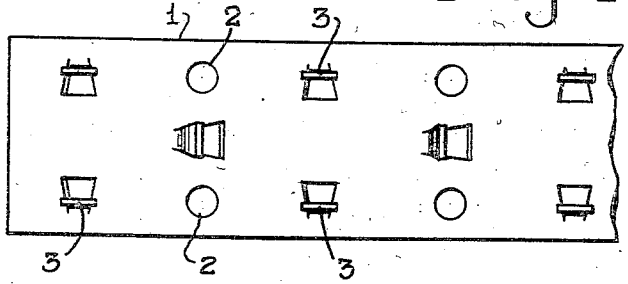
Fig. 4 is a bottom view of the backing strip showing the pressed or stamped anchor tabs for securing the backing strip to the molded composition brake shoe portion.

The backing strip 1 is arcuate in a lengthwise direction as can be seen in Fig. 2 and concave in cross-section as can be seen in Fig. 3 with the anchor tabs 3 extending in the direction of the molded composition shoe surface 5. This construction serves to increase the resistance to bending forces applied to the brake assembly and also to increase the securing forces of the backing strip to the molded composition shoe 4.

Channel strip 6 is secured to the backing strip 1, preferably by welding lengthwise along the entire length of the flanges thereof, to the center of the backing strip 1 as shown in Figs. 1–3. Due to being integrally secured to the backing strip, the channel strip adds a considerable amount of reinforcement against bending of the backing strip 1 or of the molded composition portion 4 of the shoe.

Near opposite ends of the channel strip 6 are two pairs of aligned holes 7 and 8 adapted to receive dowel pins 9 and 10, respectively, transversely of the channel strip. The dowel pins 9 and 10 may be threaded on the end adjacent their respective head ends as at 11, in the manner shown in Fig. 3.

The brake head 13 (shown in border lines in Fig. 3), which is attached to the vehicle brake rigging in conventional manner, is provided with a groove 14 to receive the channel strip 6 for mounting thereon. Two aligned tapped holes 15 and 16 are located in the brake head 13 so as to register with the holes 7 and 8 of the channel strip 6 thereby to enable the dowel pins 9 and 10 to be threaded in the side of the brake head 13 through the holes 15 and 16 of the brake head 13 with the dowel end of said pins extending through the brake head 13 and channel strip to support the brake shoe assembly (channel strip 6, backing strip 1 and molded composition shoe 4) to the brake head.

It can thus be seen that to install or remove this brake shoe assembly, it is unnecessary to move the brake head and brake hanger (not shown) away from the wheel as has heretofore been required, due to novel brake shoe assembly construction. It is now only necessary (with brakes released), to unthread and remove the dowel pins 9 and 10 from their respective holes, and slide the brake shoe assembly endwise or circumferentially around the vehicle wheel out of the groove 14 of the brake head to remove the brake shoe assembly, and similarly, in reverse order, to install a brake shoe assembly. It is not necessary to move the brake head or brake hanger in any direction, thereby not requiring excessive space which may be used to advantage for other train control purposes.

Another advantage may be seen in the fact that by threading either side of the brake head the dowel pins 9 and 10 may be inserted from either side of the vehicle wheel as may be necessitated under specific space requirements of various vehicle equipments.

Figure 6:
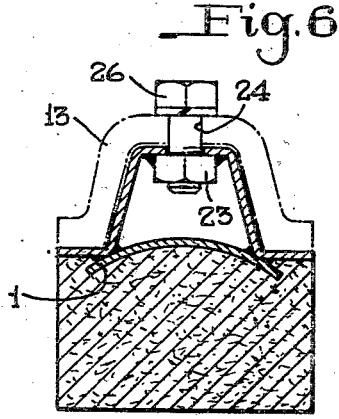
Fig. 6 is an enlarged sectional view, taken along the line 6—6 of Fig. 5.
Figure 5:
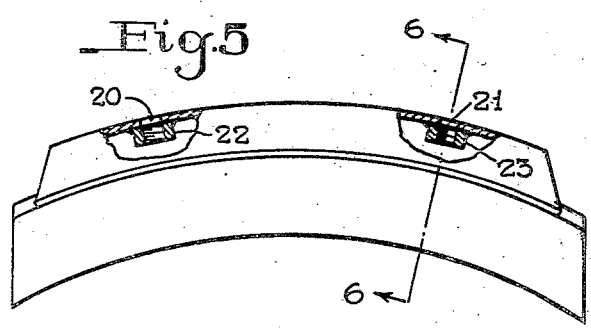
Fig. 5 is an elevational view, partly in section, of a modification of the mounting channel and shoe.

*Description—Figs. 5 and 6*

Figs. 5 and 6 disclose a second embodiment of the invention wherein the dowel pins 9 and 10, channel strip holes 7 and 8, and tapped holes 15 and 16 in the brake head, as shown in Figs. 1–3, are eliminated. In the stead of these eliminated features are two holes 20 and 21 through the top of the channel strip 6 with nuts 22 and 23 welded to the inside of the channel strip to coincide with said holes. The brake head 13 in this embodiment is provided with two drilled holes 24 coinciding with the nuts 22 and 23 such that two cap screws 26 may be inserted through the back of the brake head 13 through the holes 20 and 21 of the channel strip 6 and threaded into the nuts 22 and 23 welded thereto, to thereby secure the brake shoe assembly to the brake head.

It can thus be seen from the embodiments shown herein that by securing the channel strip 6 to the backing strip 1 which in turn has the molded shoe composition attached thereto, I have attained a maximum of reinforcement of the brake shoe assembly against any bending forces. Also, by the use of the embodiment including the dowel pins, brake shoe installation is permitted without excess clearance between the brake head and the vehicle wheel and can be accomplished from either side of the vehicle wheel, or as in the second embodiment, installation can be made from the back of the brake head.

While I have illustrated and described select embodiments of my invention, it is to be understood that these are capable of variation and modification and I therefore do not wish to be limited to the precise details set forth but desire to avail myself of such alterations as fall within the scope of the following claims.

Having now described the invention, what I claim as new and desire to secure by Letters Patent, is:

1. A brake shoe assemblage for use with a vehicle wheel, said assemblage comprising a reinforcing plate longitudinally curved to conform to the circumferential curvature of the vehicle wheel, and also being concave in cross-sectional contour, a brake shoe block of molded composition material integrally secured to said plate along the edges thereof in the molding operation, a reinforcing channel member of U-shaped cross-section having longitudinal flanges conforming to the curvature of the said plate, said channel member being secured to the exposed portion of said plate along each of the flanges of said channel member, said channel member also having a plurality of transversely extending openings therethrough, and a plurality of securing pins inserted through said openings to secure said assemblage to a supporting member.

2. A brake shoe assemblage for engagement with a rotary element to be braked to apply a braking force thereto, said assemblage comprising a brake block element of molded composition material formed with a braking face, curved according to the curvature of the rotary element to be braked, and a rear face curved substantially conformably to the curvature of the braking face, a reinforcing backing plate curved longitudinally according to the curvature of the rear face of the said brake block element and secured thereto, said backing plate also being of less width than said brake block element and being concave in cross-section on the side adjacent the brake block element so as to receive the brake block element therein, the longitudinal side edges of said backing plate being embedded along the length thereof in said brake block element in manner to leave exposed a convex portion of said plate, and a reinforcing channel member having a web and side flanges, said channel member being curved longitudinally conformably to the longitudinal curvature of said reinforcing plate and having the longitudinal edges of the side flanges of the channel member attached along the length thereof to the exposed convex portion of said backing plate.

3. A brake shoe assemblage for engagement with a rotary element to be braked to apply a braking force thereto, said assemblage comprising a brake block element of molded composition material formed with a braking face, curved according to the curvature of the rotary element to be braked, and with a rear face curved substantially conformably to the curvature of the braking face, a reinforcing backing plate curved longitudinally according to the curvature of the rear face of the said brake block element and secured thereto, said backing plate also being of less width than said brake block element and being concave in cross-section on the side adjacent the brake block element so as to receive the brake block element therein, the longitudinal side edges of said backing plate being embedded along the length thereof in said brake block element in manner to leave exposed a convex portion of said plate, and a reinforcing channel member having a web and side flanges, said channel member being curved longitudinally conformably to the longitudinal curvature of said backing plate and having the longitudinal edges of the side flanges of the channel member symmetrically attached along the length thereof on opposite sides of the longitudinal center line of said backing plate to the exposed convex portion thereof.

4. A brake shoe assemblage for engagement with a rotary element to be braked to apply a braking force thereto, said assemblage comprising a brake block element of molded composition material formed with a braking face, curved according to the curvature of the rotary element to be braked, and a rear face curved substantially conformably to the curvature of the braking face, a reinforcing backing plate curved longitudinally according to the curvature of the rear face of the said brake block element and secured thereto, said plate also being of less width than said brake block element and being concave in cross-section on the side adjacent the brake block element so as to receive the brake block element therein, the longitudinal side edges of said plate being embedded along the length thereof in said brake block element in manner to leave exposed a convex portion of said plate, a reinforcing channel member having a web and side flanges, said channel member curved longitudinally conformably to the longitudinal curvature of said backing plate and having the longitudinal edges of the side flanges of the channel member attached along the length thereof to the exposed convex portion of said backing plate, and a plurality of openings in the web of said channel for receiving securing means for mounting said brake shoe assemblage.

References Cited in the file of this patent

UNITED STATES PATENTS

| | | |
|---|---|---|
| 788,850 | Sargent | May 2, 1905 |
| 1,706,635 | Smith | Mar. 26, 1929 |
| 1,912,656 | Pogue | June 6, 1933 |
| 1,950,260 | Nelson | Mar. 6, 1934 |
| 2,331,563 | Murphy | Oct. 12, 1943 |